Dec. 18, 1934.　　　　J. L. CREVELING　　　　1,984,865
LUBRICATION DEVICE
Original Filed Sept. 17, 1931
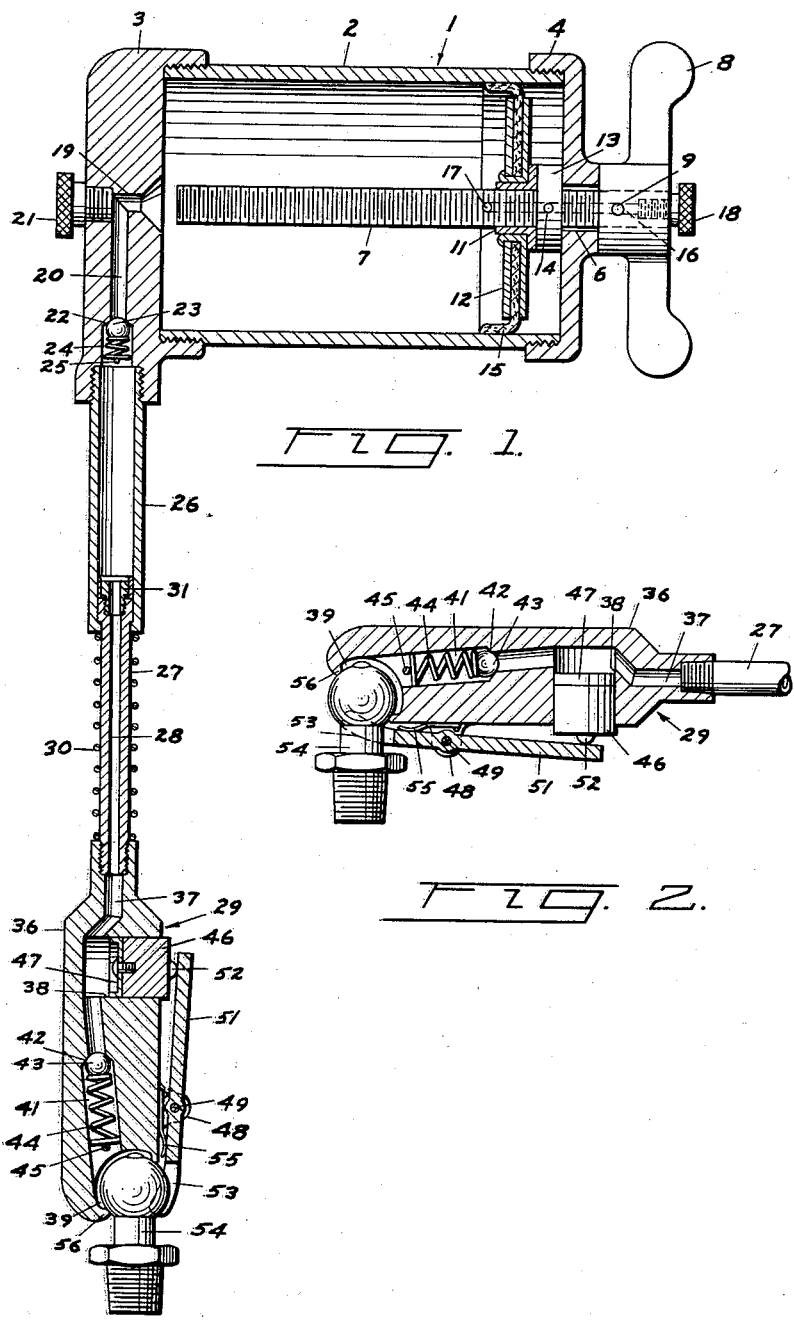
INVENTOR.
JOHN L. CREVELING
BY
ATTORNEY.

Patented Dec. 18, 1934

1,984,865

UNITED STATES PATENT OFFICE 1,984,865

LUBRICATION DEVICE

John L. Creveling, Tucson, Ariz., assignor to The Lubrication Corporation, South Bend, Ind., a corporation of Delaware Original application September 17, 1931, Serial No. 563,401. Divided and this application July 15, 1933, Serial No. 680,604

8 Claims. (Cl. 285—170)

This invention relates to lubricating devices effective to deliver lubricants including oils and grease under pressure to a bearing or other place where a lubricant is required through a so-called fitting or nipple, and, more particularly, to a clamping means for effecting a lubricant tight connection between a lubricant discharge nozzle or orifice and a fitting or nipple. This application is a division of my co-pending application Serial No. 563,401, filed September 17, 1931.

One of the objects of the invention disclosed herein is to provide a lubricating device so constructed that a single type of lubrication fitting may be used for installation in all positions, accessible and inaccessible, some or all of which might ordinarily require specially designed fittings.

Another object is to provide a lubrication coupling or clamping means which will maintain a fluid tight connection with a fitting during the lubricating operation.

A further object is to provide a coupling so constructed that as the pressure on the lubricant being supplied to the fitting is increased, the contact pressure of the clamping means against the fitting will likewise be increased, thereby to insure a tight joint even against high pressures. The construction is such, however, as to permit the coupling or clamp easily to be removed from the fitting when the pressure is relieved.

Still further objects and features of the invention, as well as the details of construction of the illustrative embodiment, will become apparent from the following description and claims and from the attached drawing in which:

Fig. 1 is a longitudinal sectional view of a clamp or coupling construction in accordance with the invention, a source of lubricant supply being illustrated in connection therewith; and, Fig. 2 is another view of the coupler clamped upon a fitting at a different angle from that in which the same coupler is illustrated in Fig. 1 as attached to the fitting.

One of the features of the invention lies in the provision of the fitting connecting face of the coupling or clamp. The coupling is provided with an annular contact surface or a circular line contact for the fitting, the surface or line being inclined to the axis of the conduit. Both line and surface contacts are considered within the scope of the invention and where either the term "contact surface" or the term "circular contact" is used in the description and claims, such term is to be construed to cover both a line contact and a surface or annular contact. The gun illustrated includes a low pressure cylinder and piston and a high pressure cylinder and piston or plunger. The high pressure portion of the gun comprises a pair of tubular telescoping members, the axes of which are substantially coincident with one another and substantially coincident with the line along which the gun is normally moved in applying the nozzle or clamp to a fitting to be lubricated.

The contact face of one of the clamping members which also forms a nozzle, is inclined to the major axis of the coupler or clamp and to the line of thrust so that the gun may be applied against the fitting from substantially any direction. As shown, the contact face makes an angle of substantially forty-five degrees to the direction of application of the coupling to the fitting and, although this angle is preferable, other angles might be used. With the contact surface of the coupling arranged at such an angle and with the proportions of the parts so arranged that the diameter of the circular contact surface is almost as great as the diameter of the ball head of the fitting, it is possible to approach a fitting from any direction throughout a hemisphere or more. By increasing the size of the circle which forms the contact surface, the range of approach and lubricant feeding may be greatly increased. However, the diameter of the contact surface must never be greater than the diameter of the fitting, otherwise, a lubricant tight seal could not be effected. Through the provision of a contact surface having a diameter nearly equal to the diameter of the ball head of the fitting, the ability to effect a seal at the contact between the coupling nozzle and the fitting is increased due to an infinite wedge effect.

Referring more particularly to the drawing, a grease gun generally designated 1 has a low pressure cylinder 2 which at one end is closed by a cap 3 and at its other end is closed by a cover 4. The cap 3 and the cover 4 are removable from the ends of the cylinder. The cover 4 is provided with an opening 6 through which a threaded stem 7 projects. The stem 7 is provided with a handle 8 secured thereto by a pin 9 and is threadedly engaged with a washer or bushing 11 which is secured in a piston 12. A collar 13 is pinned to the stem 7 by a pin 14 and serves as a spacer and thrust washer. The piston 12 is provided with a cup packing member 15 which has sufficient drag on the cylinder walls so that when the handle 8 is turned, the piston may be moved from end to end of the cylinder. A vent passage 16 extending through the stem 7 and opening at 17 on the interior of the cylinder 2, is normally closed at its outer end by a plug 18 which may be removed to permit air to escape from the interior of the cylinder as the gun is being filled, filling normally being accomplished through removal of the cap 3.

The cap 3 is provided with passageways 19 and 20 from which a vent extends, this vent normally being closed by a plug 21. The outer end of the passage or conduit 20 is enlarged to provide a shoulder 22 which forms a seat for a back-check valve 23 which is normally held against its seat by a spring 24 positioned against a pin abutment 25. Attached to the cap 14 at the terminus of the passage or conduit 20 is a high pressure cylinder 26 which forms a continuation of the conduit 20. Within the cylinder 26 is a piston or plunger 27 through which a lubricant passage 28 extends. At its outer end the piston or plunger 27 is connected with a lubricant fitting clamp or clamp nozzle generally designated 29 which may also serve as an abutment for one end of a compression spring 30 which at its other end may abut against the end of the high pressure cylinder 26. At its other end the high pressure piston or plunger 27 is provided with a piston head 31.

The clamp or clamp coupler and nozzle generally designated 29 comprises a body 36 through which a conduit or passageway 37 extends for communication with a cylinder 38 and with a space 39 the purpose of which will hereafter be described. The forward end of the conduit or passageway 37 may be enlarged as indicated at 41 to provide a shoulder 42 adapted to serve as a seat for a back check valve 43 normally held against its seat by a spring 44 which may abut against a pin 45. A piston or plunger 46 carrying a cup washer 47 is reciprocably mounted in a cylinder 38 and is subject to the full line pressure on lubricants supplied to the nozzle or clamp.

A pair of spaced lugs 48 (one shown) secure a pivot pin 49 upon which a lever or clamping member 51 is fulcrumed. At its inner end the lever or clamping member 51 is adapted to engage and abut against a boss 52 formed on the piston or plunger 46 and at its outer end this clamping member may be forked as indicated at 53, the better to engage a fixed part rigid with the lubricant receiving end of a fitting or nipple such as the spherical headed nipple 54. A leaf spring or the like 55 may be secured to the body 36 between the body and the clamping member 51 normally to open the jaws of the clamp and to maintain the inner end of the lever or clamp member 51 in engagement with the boss 52.

The space 39 is surrounded by a fitting contact portion 56 which may make contact with the spherical head of the fitting 54 close to a diameter of this head and such contact may be either a line contact or an area contact comprising a zone of a sphere. Since the fitting contact portion is circular and the fitting head is spherical, a complete seal may be effected between the clamp coupler and the fitting head, and with the diameter of the contact portion 56 closely approaching the diameter of the spherical head of the fitting, the enlarged space 39 permits lubricant to be fed into and through the fitting inlet orifice over a range of angles equivalent to those included within a hemisphere or more. This fact is demonstrated graphically to some extent in Figs. 1 and 2.

The operation of the gun and clamp coupler should be obvious from the description hereinabove given, but may be briefly summarized as follows: Assuming the gun to be loaded with the proper lubricant to be put into a particular fitting and thus into a bearing (in Fig. 1 the parts of the gun are shown as they would appear with the gun loaded and ready for operation), a turn or two on the handle 8 will force lubricant from the cylinder 2 through the passageways or conduits 19 and 20, past ball check valve 23, into the high pressure cylinder 26, and, if enough pressure be exerted on the handle 8, lubricant may also be forced under low pressure into and through the conduit or passage 28 into the high pressure piston or plunger 27. Upon placing the clamp coupler or nozzle against the fitting or nipple to be serviced, a thrust upon the gun along or parallel with the axes of the conduit 20, high pressure cylinder 26, and high pressure plunger 27, will cause the plunger or piston 27 to telescope within the high pressure cylinder 26 and force lubricant under high pressure into and through the conduit or passageway 37, into the cylinder 38 and past the check valve 43 into the space 39 and into the fitting 54. The body 36 of the coupler, i. e., the outer end portion thereof, and the lever or clamp member 51 constitute a pair of jaws or clamp arms adapted to clamp the fitting or nipple tightly therebetween against the tendency of pressure on lubricant in the space 39 to push the coupler from the fitting. This clamping, of course, is effected through the pressure on the lubricant in cylinder 38 exerted against the piston or plunger 46 which forces the piston or plunger 46 partially out of the cylinder thereby to urge the clamping member or clamping arm 51 about its pivot 49 and into tight engagement behind some abutment fixed with respect to the lubricant receiving end of the fitting, such, for instance, as the back surface of the spherical head of the fitting or nipple 54.

While I have illustrated and described what may be considered a preferred form of the invention, various modifications and changes may be made without departing from the spirit of the invention or the scope of the appended claims.

I claim:

1. In a lubricant fitting clamp, a cylinder, a piston therein, a clamping arm associated with said piston for movement thereby and therewith, a clamping arm associated with said cylinder, the ends of said arms being relatively movable whereby to effect a sealing engagement between the lubricant receiving end of a fitting and one of said arms, a conduit for supplying lubricant to the receiving end of the fitting through the arm engaged therewith and having a connection with said cylinder, a back check valve in said conduit ahead of said cylinder, and a back check valve in the conduit between said cylinder and the arm engaged with said fitting end.

2. In a lubricant fitting clamp, a cylinder for lubricant, a piston in said cylinder and subject to the influence of lubricant pressure therein, a pair of clamping arms, one of said arms being associated with said cylinder and providing a lubricant discharge orifice member for engagement with and against the lubricant receiving end of a fitting, the other of said arms being associated with said piston and movable thereby to move the ends of the arms relatively to one another whereby to clamp said orifice member against said fitting end, a conduit for supplying lubricant to said cylinder and to said discharge orifice member, and a back-check valve between said cylinder and the discharge orifice member.

3. A clamp coupler for lubricant fittings comprising, a pair of clamping jaws relatively movable toward and from one another, one of said jaws providing a nozzle for supplying lubricant under pressure to the fitting, the other of said jaws being adapted to draw the nozzle jaw tightly against the fitting, a conduit for supplying lubricant from a source of supply to said nozzle, means responsive to pressure on lubricant in said conduit for moving said jaws relatively to one another, and valve means in said conduit and opening in the direction of normal flow of lubricant from the source to the fitting, between the lubricant source and pressure responsive means and between the pressure responsive means and nozzle.

4. A clamp coupler for a lubricant fitting having a lubricant receiving orifice in one end thereof comprising, a pair of clamping jaws relatively movable toward and from one another, one of said jaws providing a nozzle for supplying lubricant under pressure to said fitting, said nozzle having a seal effecting means adapted to make a seal with the fitting surface about and adjacent to the fitting orifice at said end, said jaws serving to force said nozzle jaw and fitting end into seal effecting relationship when moved relatively to one another, a conduit for supplying lubricant from a source of supply to said nozzle, means including a piston subjected to the pressure on lubricant in said conduit for moving said jaws relatively to one another, said piston being operatively associated with the other jaw, and check valve means in said conduit and opening in the direction of normal flow of lubricant from the lubricant source to the fitting, said valve means being disposed between said piston and said source of lubricant supply and between said piston and said nozzle.

5. A clamp coupler for lubricant fittings comprising, a pair of clamping jaws relatively movable toward and from one another, said jaws being pivotally secured together, one of said jaws providing a nozzle for supplying lubricant under pressure to the fitting, the other of said jaws being adapted to secure the nozzle jaw tight against the fitting, a conduit for supplying lubricant from a source of supply to said nozzle, means responsive to pressure on lubricant in said conduit for moving said jaws relatively to one another, and valve means in said conduit and opening in the direction of normal flow of lubricant from the source to the fitting, between the lubricant source and pressure responsive means and between the pressure responsive means and nozzle.

6. A clamp coupler for lubricant fittings comprising, a pair of clamping jaws relatively movable toward and from one another, said jaws being pivotally secured together, one of said jaws providing a nozzle for supplying lubricant under pressure to the fitting, the other of said jaws being adapted to secure the nozzle jaw tight against the fitting, a conduit for supplying lubricant from a source of supply to said nozzle, means responsive to pressure on lubricant in said conduit for moving said jaws relatively to one another, valve means in said conduit and opening in the direction of normal flow of lubricant from the source to the fitting, between the lubricant source and pressure responsive means and between the pressure responsive means and nozzle, and spring means normally tending to spread said arms apart toward a fitting releasing position.

7. A clamp type lubricant nozzle comprising, means providing a lubricant conduit, a pressure responsive device responsive to the pressure on lubricant in said conduit, a pair of fitting clamping arms, one of said arms being associated with said means, the other arm being associated with and movable by said pressure responsive device, one of said arms providing a discharge orifice, means pivotally associating said arms for movements relatively toward another whereby to clamp, a fitting therebetween when said pressure responsive device is subject to lubricant pressure, a back check valve in said conduit between said pressure responsive device and a source of pressure, and a back check valve between said pressure responsive device and said discharge orifice.

8. A clamp type lubricant nozzle comprising, means providing a lubricant conduit, a pressure responsive device responsive to the pressure on lubricant in said conduit, a pair of fitting clamping arms, one of said arms being associated with said means, the other arm being associated with and movable by said pressure responsive device, one of said arms providing a discharge orifice, means pivotally associating said arms for movements relatively toward another whereby to clamp, a fitting therebetween when said pressure responsive device is subject to lubricant pressure, a back check valve in said conduit between said pressure responsive device and a source of pressure, a back check valve between said pressure responsive device and said discharge orifice, and means normally tending to spread said arms apart toward a fitting releasing position.

JOHN L. CREVELING.